United States Patent
Eads

(10) Patent No.: US 11,514,355 B2
(45) Date of Patent: Nov. 29, 2022

(54) FLAT REPRESENTATION OF MACHINE LEARNING MODEL

(71) Applicant: General Electric Company, Schenectady, NY (US)

(72) Inventor: Damian Ryan Eads, San Francisco, CA (US)

(73) Assignee: General Electric Company, Schenectady, NY (US)

( * ) Notice: Subject to any disclaimer, the term of this patent is extended or adjusted under 35 U.S.C. 154(b) by 1198 days.

(21) Appl. No.: 16/012,885

(22) Filed: Jun. 20, 2018

(65) Prior Publication Data

US 2019/0005411 A1 Jan. 3, 2019

Related U.S. Application Data

(60) Provisional application No. 62/526,233, filed on Jun. 28, 2017.

(51) Int. Cl.
| | |
|---|---|
| *G06F 9/44* | (2018.01) |
| *G06N 20/00* | (2019.01) |
| *G06F 9/445* | (2018.01) |
| *G06F 16/22* | (2019.01) |
| *G06N 20/20* | (2019.01) |
| *G06N 5/00* | (2006.01) |
| *G06N 3/04* | (2006.01) |

(52) U.S. Cl.
CPC ......... *G06N 20/00* (2019.01); *G06F 9/44557* (2013.01); *G06F 16/2246* (2019.01); *G06N 5/003* (2013.01); *G06N 20/20* (2019.01); *G06N 3/04* (2013.01)

(58) Field of Classification Search
None
See application file for complete search history.

(56) References Cited

U.S. PATENT DOCUMENTS

| | | | |
|---|---|---|---|
| 2014/0337269 A1* | 11/2014 | Eads | G06N 5/02 706/46 |
| 2018/0300613 A1* | 10/2018 | Petre | G06F 9/5061 |
| 2018/0357565 A1* | 12/2018 | Syed | G06N 20/10 |

* cited by examiner

*Primary Examiner* — Insun Kang
(74) *Attorney, Agent, or Firm* — Buckley, Maschoff & Talwalkar LLC

(57) ABSTRACT

The example embodiments are directed to a system and method for deploying a machine learning model using a parse-free memory allocation. In one example, the method may include one or more of receiving a request to deploy a machine learning model, in response to receiving the request, creating a memory map comprising a mapping of a data structure for storing an unpacked flat representation of the machine learning model, allocating a contiguous block of memory of the data structure that is mapped by the memory map, loading data blocks of the unpacked flat representation of the machine learning model into the allocated contiguous blocks of memory of the data structure, and storing an offset associated with the contiguous block of memory in storage.

20 Claims, 5 Drawing Sheets

FLAT REPRESENTATION OF MACHINE LEARNING MODEL

CROSS-REFERENCE TO RELATED APPLICATION(S)

This application claims the benefit under 35 USC § 119(e) of U.S. Provisional Patent Application No. 62/526,233, filed on Jun. 28, 2017, in the United States Patent & Trademark Office, the entire disclosure of which is hereby incorporated for all purposes.

BACKGROUND

Machine and equipment assets are engineered to perform particular tasks as part of a process. For example, assets can include, among other things and without limitation, industrial manufacturing equipment on a production line, drilling equipment for use in mining operations, wind turbines that generate electricity on a wind farm, transportation vehicles, gas and oil refining equipment, and the like. As another example, assets may include devices that aid in diagnosing patients such as imaging devices (e.g., X-ray or MM systems), monitoring equipment, and the like. The design and implementation of these assets often takes into account both the physics of the task at hand, as well as the environment in which such assets are configured to operate.

Low-level software and hardware-based controllers have long been used to drive machine and equipment assets. However, the rise of inexpensive cloud computing, increasing sensor capabilities, and decreasing sensor costs, as well as the proliferation of mobile technologies, have created opportunities for creating novel industrial and healthcare based assets with improved sensing technology and which are capable of transmitting data that can then be distributed throughout a network. As a consequence, there are new opportunities to enhance the business value of some assets through the use of novel industrial-focused hardware and software. For example, analytic applications are being used to visualize and enhance operations of machine and equipment assets using data captured from an asset. Analytics can provide some form of understanding of the data to a user.

A primary component of an analytic software application is a machine learning model which can used to make predictions based on historical trends and patterns within input data. Machine learning models can consume significant computing resources and therefore are typically stored in an offline state (e.g., cold storage, etc.) until they are needed. In order to conserve memory space, a machine learning model is packed tightly before it is stored.

As a result, serialization and deserialization is often a major bottleneck in loading and deploying a packed machine learning model. For example, when a machine learning model is loaded by a compute node to be used by an application, the machine learning model must be parsed and loaded into memory. The parsing is usually done serially and requires an unpacking operation to convert the data back to its original form. Unfortunately, the parsing and unpacking of the machine learning model puts significant strain on the central processing unit (CPU), which can not only waste input/output (I/O) bandwidth but also cause the machine learning model to take significant time to load.

SUMMARY

The example embodiments improve upon the prior art by providing a memory allocation system and method for deploying a machine learning (ML) model from cold storage that is significantly faster than related techniques. The system stores an ML model as a parse-free memory (PMM) model that can be traversed by a processor without parsing and unpacking. The PMM model is also referred to as an unpacked flat representation. The PMM model may be stored on disk or some other cold storage in an organized data structure (e.g., in a file, a shared memory, etc.) that is mapped by a memory map. In response to receiving a request for the ML model, the system can load the ML model from the cold storage to an address such as a virtual memory based on the memory map. Accordingly, the system can deploy the ML model from an offline state to an online state without requiring significant parsing or unpacking of the model improving the latency at which the model is deployed, sometimes by orders of magnitude.

According to an aspect of an example embodiment, a computing system includes one or more of a storage, and a processor in communication with the storage and configured to receive a request to deploy a machine learning model, in response to receiving the request, create a memory map comprising a mapping of a data structure for storing an unpacked flat representation of the machine learning model, allocate a contiguous block of memory of the data structure mapped by the memory map, load data blocks of the unpacked flat representation of the machine learning model into the allocated contiguous blocks of memory of the data structure, and store an offset associated with the contiguous block of memory in the storage.

According to an aspect of another example embodiment, a computer-implemented method includes one or more of receiving a request to deploy a machine learning model, in response to receiving the request, creating a memory map comprising a mapping of a data structure for storing an unpacked flat representation of the machine learning model, allocating a contiguous block of memory of the data structure that is mapped by the memory map, loading data blocks of the unpacked flat representation of the machine learning model into the allocated contiguous blocks of memory of the data structure, and storing an offset associated with the contiguous block of memory in storage.

Other features and aspects may be apparent from the following detailed description taken in conjunction with the drawings and the claims.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

Figure 1A:
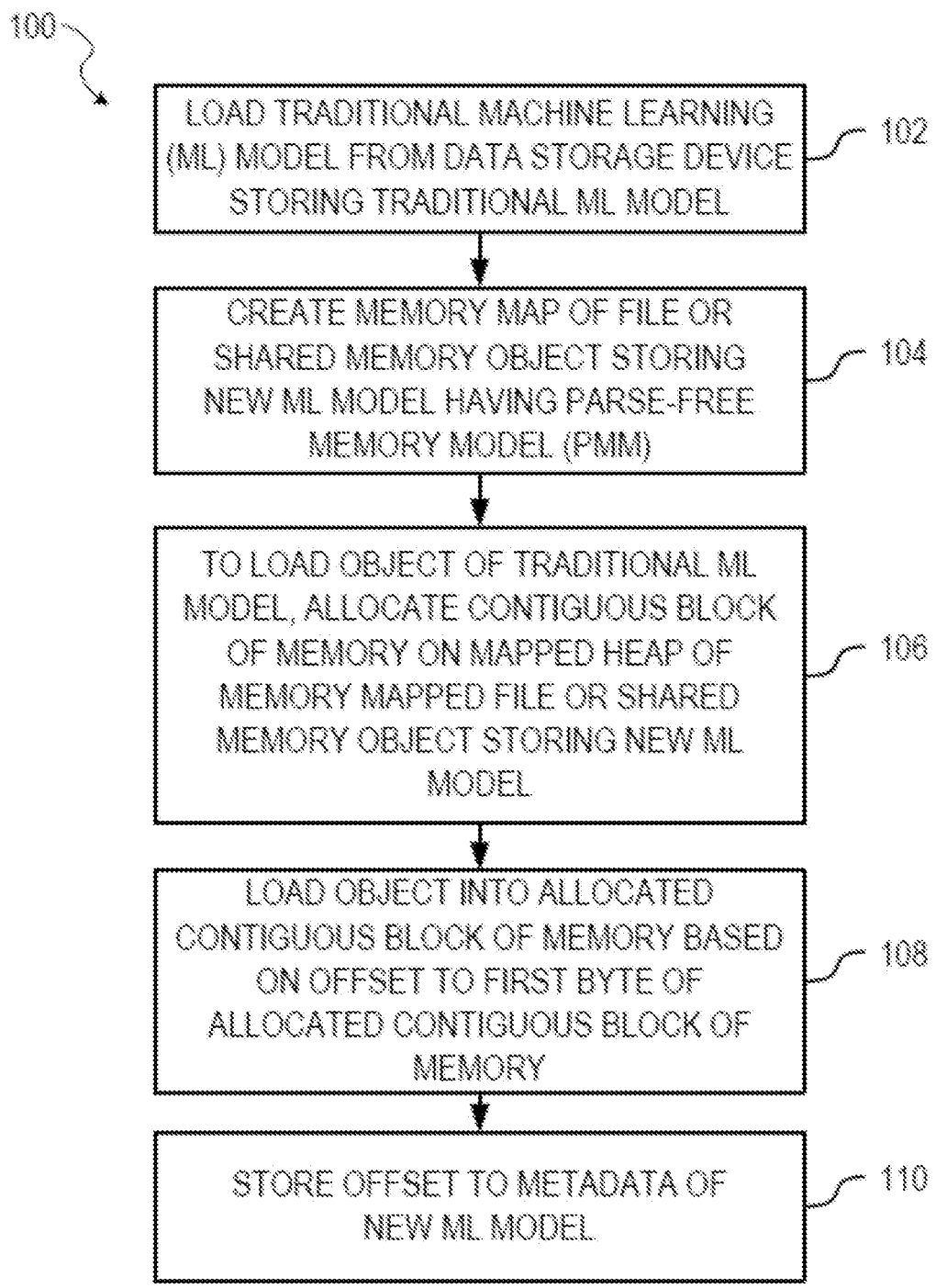
FIG. 1A is a flowchart illustrating an example method for converting a traditional ML model to a ML model including a parse-free memory model (PFM), in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

One type of data that is commonly packed during offline storage (also referred to as cold storage) is a machine learning model (ML). In the field of data analytics, machine learning is a process that is used to devise complex models and algorithms that lend themselves to performing a prediction (also referred to as predictive analytics). Analytical models allow researchers, data scientists, engineers, analysts, and the like, to produce reliable, repeatable decisions and results and uncover hidden insights by learning from historical relationships and trends in the data. Deep learning is part of a broader family of machine learning methods based on learning data representations rather than learning task-specific algorithms.

As a non-limiting example, a ML model may be an output generated from training a machine learning algorithm with a training data-set. The ML model may be implemented as a software program, procedure, application, code, and/or the like. As one non-limiting example of machine learning, a decision tree algorithm may be trained using a structured training data-set for anomaly detection in a network to identify malicious packets. In this example, the training may generate a ML model which is configured to take in an input (e.g., a packet, data about a packet, data about a network, etc.) and generate a result set corresponding to each packet.

When a machine learning model is loaded by a compute node for use by an application, the machine learning model must be parsed and loaded into memory. For example, a deploying operation may trigger a computing node to pull a ML model from cloud storage where ML model files are archived. Once the ML model file is pulled onto the cloud machine, the model must be loaded into memory (e.g., RAM) for execution. ML models can be written in various formats (e.g., binary, XML, JSON, MDFS, PMML, etc.). When loading the ML model file, the computing node may parse the model file in whatever format it is in and translate the file into an in-memory data structure that can be traversed. Depending on the computer, the parsing process can be a bottleneck because the speed of the computing node reading from disk is significantly faster than the parsing speed. For example, the I/O disk reading speed may be able to read from disk at 2 GB/s while the parsing, unpacking, and loading of the model into memory may be 50 MB/s, which is only 1/40$^{th}$ of the total bandwidth. As a result, related ML model loading systems do not make effective use of the bandwidth of the I/O.

The example embodiments provide a system that requires minimal to no parsing and unpacking. In particular, the system described herein may store a ML model as a parse-free memory model (PFM) which is a flat and unpacked representation of the ML model. Furthermore, a memory map can be created from the PFM model file based on how the model is organized in the file. Loading the ML model from the PFM model file to memory based on the memory map does not require parsing or unpacking of the data. Accordingly, when the model is brought from cold storage to executable memory during a deployment operation, the ML model can be traversed immediately based on the memory map. Therefore, an operating system can begin paging in pages or data blocks of the ML model from disk that are not in memory in real-time. Because of the flat representation of the ML model, the system can actually transfer the ML model from file into memory with almost the same throughput as the output (e.g., 1.9 GB/s).

The system and the software described herein may be incorporated within or otherwise used in conjunction with applications for managing machine and equipment assets and can be hosted within an Industrial Internet of Things (IIoT). For example, an IIoT may connect manufacturing plants and assets, such as turbines, jet engines, locomotives, elevators, healthcare devices, mining equipment, oil and gas refineries, and the like, to the Internet, the cloud, and/or to each other in some meaningful way such as through one or more networks. The system described herein can be implemented within a "cloud" or remote or distributed computing resource which includes clustered computing resources capable of efficiently deploying many ML models. The cloud can be used to receive, relay, transmit, store, analyze, or otherwise process information for or about assets and manufacturing sites. The cloud computing system can further include or can be coupled with one or more other processor circuits or modules configured to perform a specific task, such as to perform tasks related to asset maintenance, analytics, data storage, security, or some other function.

Integration of machine and equipment assets with the remote computing resources to enable the IIoT often presents technical challenges that are separate and distinct from the specific industry and from computer networks, generally. An asset (e.g., machine or equipment) may need to be configured with novel interfaces and communication protocols to send and receive data to and from distributed computing resources. Also, assets may have strict requirements for cost, weight, security, performance, signal interference, and the like. As a result, enabling such an integration is rarely as simple as combining the asset with a general-purpose computing system.

The Predix™ platform available from GE is a novel embodiment of such an Asset Management Platform (AMP) technology enabled by state of the art cutting edge tools and cloud computing techniques that enable incorporation of a manufacturer's asset knowledge with a set of development tools and best practices that enables asset users to bridge gaps between software and operations to enhance capabilities, foster innovation, and ultimately provide economic value. Through the use of such a system, a manufacturer of industrial and/or healthcare based assets can be uniquely situated to leverage its understanding of assets themselves, models of such assets, and industrial operations or applications of such assets, to create new value for industrial customers through asset insights.

Traditionally, when machine learning (ML) models are "offline" (e.g., stored on disk and not in RAM), they are not ready to serve predictions until they are loaded into memory. Usually, this involves parsing the model, which can be quite large (e.g., 100 GB or larger) and thus takes time to load (e.g., 1 hour or more). This results in an unacceptable latency between receiving a request that is served by the model after it loads and delivers a prediction.

Various embodiments described herein provide for a representation of a machine learning (ML) model that improves on the ML model's ability to be loaded, deployed, or both. For some embodiments, the representation of the ML model comprises a parse-free memory model (PMM) that stores a machine learning model so that the ML model loads into memory with minimal parsing. When the ML model is "offline" and not available to serve prediction requests, instead of loading and parsing the ML model in its entirety, various embodiments parse and load metadata (e.g., comprising a few bytes or megabytes) that is associated with the ML model and describes how the ML model is laid out and organized. Using the loaded metadata, appropriate chunks (e.g., byte-by-byte copy) of the ML model (e.g., individual trees of a decision forest) can be identified, loaded into memory, and utilized to serve the request (i.e., to make a prediction based on the request). In this way, embodiments described herein prioritize the loading of the relevant parts of the ML model so that predictions can be served more efficiently while the ML model is loaded. Various embodiments described herein can also leverage an operating system's page cache so that a small part of the ML model can be traversed quickly (e.g., immediately or almost immediately) without needing to wait until the entire ML model is loaded into memory. The ML model of various embodiments is considered a flat representation of the ML model because the ML model is not packed with bytes. Without byte packing, less data needs to be parse.

Accordingly, the embodiments disclosed herein dramatically improve the performance and usability of an application that may rely on an ML model by permitting the application to serve ML-assisted predictions far more quickly than prior art techniques. As a result, the embodiments disclosed herein may result in a wide range of salutary benefits and make ML models available for a wide variety of use cases that were previously unsuitable for complex ML due to the significant latency and other issues associated with the prior art.

Use of various embodiments described herein result in effective I/O throughput on a compute node that is closer to the I/O bandwidth than previous possible. Particularly, the ML model of some embodiments can be loaded for prediction at the limit of I/O (e.g., limit of loading from disk to RAM). Accordingly, embodiments may reduce the latency to first prediction using the ML model when the ML model is "offline" by an order of magnitude or more, for example reducing the time to load a model from over an hour to bring a model "online" under prior art techniques to under a minute. For some such embodiments, the only latency to the first prediction becomes the I/O latency of loading the necessary chunks of the ML model. With respect to some embodiments, the ML model is stored on local disk of a compute node and loading the ML model involves a memory mapping of data chunks in the ML model, which may minimize or obviate the need to load the whole model to start servicing predictions.

With respect to implementation, a given ML model traditionally includes a set of decision trees and may already include metadata of the model (e.g., regarding accuracy on training set, author, subject matter, etc.). Traditional ML models comprise pointers that connect objects within decision tree.

Rather than utilizing pointers to represent different parts of a decision tree, various embodiments described herein utilize stored offsets for objects in the decision tree. For example, some embodiments use a self-managed memory heap to load ML models and return offsets for the loaded ML model, rather than using pointers. Some embodiments involve taking over management of memory (or at least memory management of ML models) from the operating system. Alternatively, the specialized memory heap may be self-managed in user memory space. The self-managed memory of some embodiments utilize memory headers to manage memory blocks—the headers know what blocks are free and which are not (like a heap). When memory needs to be allocated for a ML model, the memory manager returns offsets instead of pointers. The returned offsets are stored in the metadata of the ML model.

During operation, a system of some embodiments chooses how much of a memory block is needed (e.g., needs to be big enough block for all objects of a ML model). In response, a memory allocator of the system provides contiguous blocks of memory. When the memory manager of the system is asked for a free block, the memory manager returns an offset instead of a pointer and marks the block as used (in the header). At that point, an ML model, previously containing pointers, is converted into a flat representation (with offsets) and loaded into the free block.

In programming environments, data objects can live inside a process's memory and make use of its dynamic memory management facility—often referred to as a process heap. A request for a new allocation of a contiguous block of memory is made via system calls. For instance, a request may be made to the standard library (e.g., via malloc( )) for UNIX or HeapAlloc( ) for Windows® operation systems), and then a system call can be made by the operating system to request a page if needed. If the request succeeds, a virtual address is returned pointing to the first byte of the block that was successfully allocated. Unfortunately, on most modern systems, this address has no relevance outside the process in which the block was allocated.

According to various embodiments, a ML model does not use a process's dynamically managed heap but, rather, uses memory maps to a file or shared memory where the ML model is stored. In particular, some embodiments store relative offsets to the first byte of a memory mapped file that stores the ML model. In this way, storing absolute pointer addresses of structure elements of a ML model can be avoided.

For some embodiments, a heap for the memory mapped (e.g., memory mapped) block is maintained by a heap-like memory management data structure, which may live in a shared memory object or memory-mapped file (mapped heap), rather than living in a process heap. When a block of contiguous bytes is requested from the mapped heap, an offset to the first byte of the mapped heap can be returned, rather than loading the entirety of the mapped heap itself.

The structure of the mapped heap for a ML model may comprise a collection of data objects. Each data object may comprise a collection of fields and each field may comprise one or more of a type code, a length, and an offset that points to a list of values. A list can be used for, for example, to define a mapping from node identifiers (IDs) (e.g., for graphs or trees) to values.

According to some embodiments, a PMM file storing a ML model comprises one or more of the following data types:

offset<T>: a 64-bit integer pointing to the first byte of an object of type T;
array<T>: an object that contains a length and a contiguous array of objects of type T;
int: a single 64-bit integer;
float: a single 64-bit float;
string: a single UTF-8 string;
bool: a byte-encoded boolean value;
vint: a vector of 64-bit integers;
vfloat: a vector of 64-bit floats;
vbool: a bitmap; and
vstring: a vector of UTF-8 strings.

In a PMM file, an int can be represented as a 64-bit little endian integer, a float can be present by a 64-bit IEEE 754 float, and a bitmap can be represented as a sequence of bytes big enough to hold a required number of bits. For some embodiments, primitive int and floats are not packed and, as such, they can be accessed with just an offset relative to the start of a mapped heap without need for parsing/unpacking.

With respect to organization of an ML model, for some embodiments, the following grammar defines how the ML model is organized in a mapped heap. At the root, there can be a model, which has two fields: a number of objects and the starting offset of each object.

model:=NUM_OBJECTS:int (OBJECT_OFFSET: offset<object>)^NUM_OBJECTS

The object offsets can be assumed to point to data of type 'object'. The temporary address of an object can be trivially deduced from its offset in the OBJECT_OFFSETS array.

An object can comprise an int that represents number of fields and the starting offset of each field. A field of an object can be deduced from its offset in the FIELD_OFFSETS array.

object:=NUM_FIELDS:int (FIELD_OFFSET: offset<field>)^NUM_FIELDS

A field can comprise a type code, a name, a length, and a value. Valid values can include the following: type code 0=int; type code 1=float; type code 2=bool; type code 3=string; type code 4=vint; type code 5=vfloat; type code 6=vbool; and type code 7=vstring.

field:=TYPE_CODE:int NAME:string LEN:int DATA_OFFSET: offset<array<T, LEN>>

The interpretation of each of VALUE may depend on TYPE_CODE. For instance, the interpretation may comprise one or more of the following:

0/int: the VALUE may be interpreted as a raw integer;
1/float: the VALUE may be interpreted as a raw float;
2/bool: the VALUE may be interpreted as a byte-encoded bool;
3/string: the VALUE may be interpreted as an offset to a string (see, string grammar);
4/vint: the VALUE may be interpreted as an offset to a vector of integers (see, vint grammar);
5/vbool: the VALUE may be interpreted as an offset to a vbool;
6/vfloat: the VALUE may be interpreted as an offset to a vfloat; and
7/vstring: the VALUE may be interpreted as an offset to a vstring.

A string datum may be defined by a length and an offset in the mapped heap pointing to a contiguous sequence of LEN bytes that define the string in its UTF-8 encoding.

string:=LEN:int DATA_OFFSET:offset<byte>

A string vector datum may be defined by a length and an offset in the mapped heap pointing to the first offset<string> in a contiguous sequence of at least LEN offset<string> to string objects.

vstring:=LEN:int (SIR_OFFSET:offset<string>^LEN)

An int vector datum may be defined by a length and an offset in the mapped heap pointing to the first int in a contiguous sequence of at least LEN int objects.

vint:=LEN:int INT_OFFSET:offset<int>

A float vector datum may be defined by a length and an offset in the mapped heap pointing to a contiguous sequence of at least LEN float objects.

vfloat:=LEN:int FLOAT_OFFSET:offset<float>

A bool vector datum may be defined by a length and an offset in the mapped heap pointing to a contiguous sequence of floats.

vbool:=LEN:int BUFFER_OFFSET:int DATA: offset<bitmap>

With respect to metadata associated with a ML model, according to some embodiments, the first object in the ML model is reserved for metadata general to the entire ML model. The metadata stored in this first object may store characteristics of the training set used to train the ML model. Example characteristics can include, without limitation, one or more of the following:

total number of features;
feature types;
the number of levels and the names of the levels for each categorical feature;
the out-of-bag error (for bagging ensembles);
the type of algorithm used for training;
the type of ML model used for prediction;
the names of features that are optional for prediction;
the names of features unused for prediction;
the training parameters represented as a string in JavaScript Object Notation (JSON) format;
statistical diagnostics in regard to the ML model;
the name of the target; and
the names of other key features that may have special interpretations.

According to some embodiments, a PMM can represent a binary decision tree. The binary decision tree may comprise k non-leaf nodes and r leaf nodes, and one or more fields of the PMM may represent data for the leaf nodes, while one or more other fields represent data for non-leaf nodes. The following are some example fields representing data for nodes of the binary decision tree.

Left (size k, type int): represents the index to the left child node. This is a size k field where left[i]==j where j is the field index of the j'th non-leaf node if j>=0, and (−j−1)'th leaf node if j<0.
Right (size k, type int): index to the right child node. This is a size k field where right[i]==j where j is the field index of the j'th non-leaf node if j>=0, and (−j−1)'th leaf node if j<0.
Feature index (size k, type int): the feature involved in the split.
Threshold or categorical membership bitmap (size k, type int/float/vbool): a threshold to apply or a categorical membership test.
Prediction (size r, int/float): the vote prediction[i] if a decision tree traversal lands into the leaf node i.

Any other data for each non-leaf and leaf node can be stored by adding additional fields.

According to some embodiments, a PMM can represent a directed graph, which can permit a ML model comprising the PMM to implement a neural network. For instance, for a direct graph comprising k nodes, one or more fields of the PMM may include the following. A directed graph may be used to represent a neural network, such as a convolutional neural network (CNN), recurrent neural network (RNN), adversarial neural network, or Long short-term memory (LSTM).

in_vertices (size k, vint): in_vertices[i] represents a vector of vertex indices that flow into vertex i.

out_vertices (size k, vint): out_vertices[i] represents a vector of vertex indices that flow out of vertex i.

Any other relevant data can be stored for each graph node by adding additional fields.

With respect to loading and traversing a ML model, for some embodiments, a PMM is loaded by creating a memory map to the file or shared memory object that represents the model. In this way, a ML model comprising the PMM can be traversed without any unpacking. In particular, when struct field element is needed, the offset (which can be accessed in O(1) time) may be translated into a pointer. Accordingly, a PMM can be traversed by returning temporary wrapper objects that translate offsets to temporary pointers that are computed from the starting address of the memory map.

With respect to deployment, various embodiments can be useful in deploying an ML model to a single compute instance or to multiple compute instances, which can be useful when horizontal scaling in a distributed processing environment, such as a multicore architecture. For instance, when the volume of prediction requests is beyond capacity of existing compute instances, systems may respond by spawning more compute instances and moving/deploying ML models to those spawned instances so that they can serve those requests. Various embodiments enable those newly spawned compute instances to load the ML models and become useful at serving predictions more quickly than traditionally possible. Additionally, various embodiments enable compute instances (e.g., in multi-tenant contexts) can be quickly spin up in response to a predictions request, server the request, and then be spun down. Particular embodiments can be quickly loaded into memory that is shared by multiple cores of one or more processors (e.g., SMP architecture), and the cores can share the loaded model to quickly serve requests in parallel. These are just some of the ways that embodiments described herein cam rapidly serve, deploy, and horizontally scale servicing prediction requests.

Reference will now be made to embodiments of the present disclosure, examples of which are illustrated in the appended drawings. The present disclosure may, however, be embodied in many different forms and should not be construed as being limited to the embodiments set forth herein.

FIG. 1 is a flow chart illustrating an example method 100 for converting a traditional ML model to a ML model including a PMM, according to various embodiments of the present disclosure. As shown in FIG. 1, the method 100 begins with operation 102 loading traditional ML model from a data storage device storing the traditional ML model (e.g., a file stored on persistent data storage).

The method 100 continues with operation 104 creating a memory map of a file or shared memory object storing a new ML model having a parse-free memory model. To load an object of the traditional ML model, the method 100 continues with operation 106 allocating (e.g., by a ML model memory manager) a contiguous block of memory on a mapped heap of the memory mapped file or shared memory created by operation 104. For some embodiments, this allocation process results in an offset to a first byte of the contiguous block of memory allocated on the mapped heap. This allocation process may be performed for each object of the traditional ML model, which will eventually permit the traditional ML model to be converted to the new ML model having a parse-free memory model, which is a flat-representation of the ML model.

The method 100 continue with operation 108 loading the object into the contiguous block, allocated by operation 106, based on an offset to the first byte of the contiguous block of memory allocated on the mapped heap.

The method 100 continue with operation 110 storing the offset to metadata of the new ML model. According to some embodiments, the metadata may be stored as an object (e.g., first object) stored, and accessed, through the mapped heap.

Figure 2:
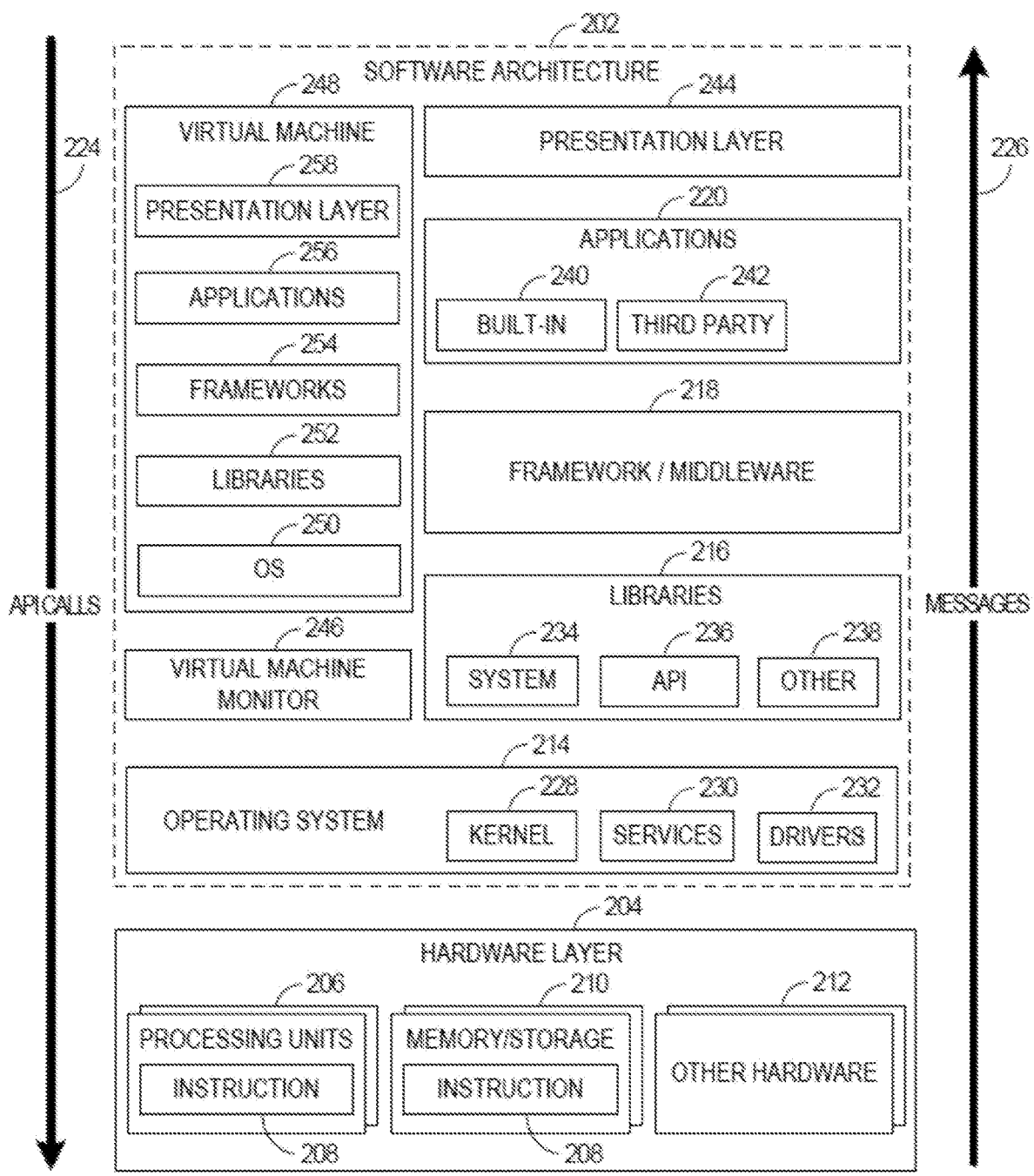
FIG. 2 is a block diagram illustrating an example software architecture, which may be used in conjunction with various hardware architectures herein described, in accordance with an example embodiment.
Figure 3:
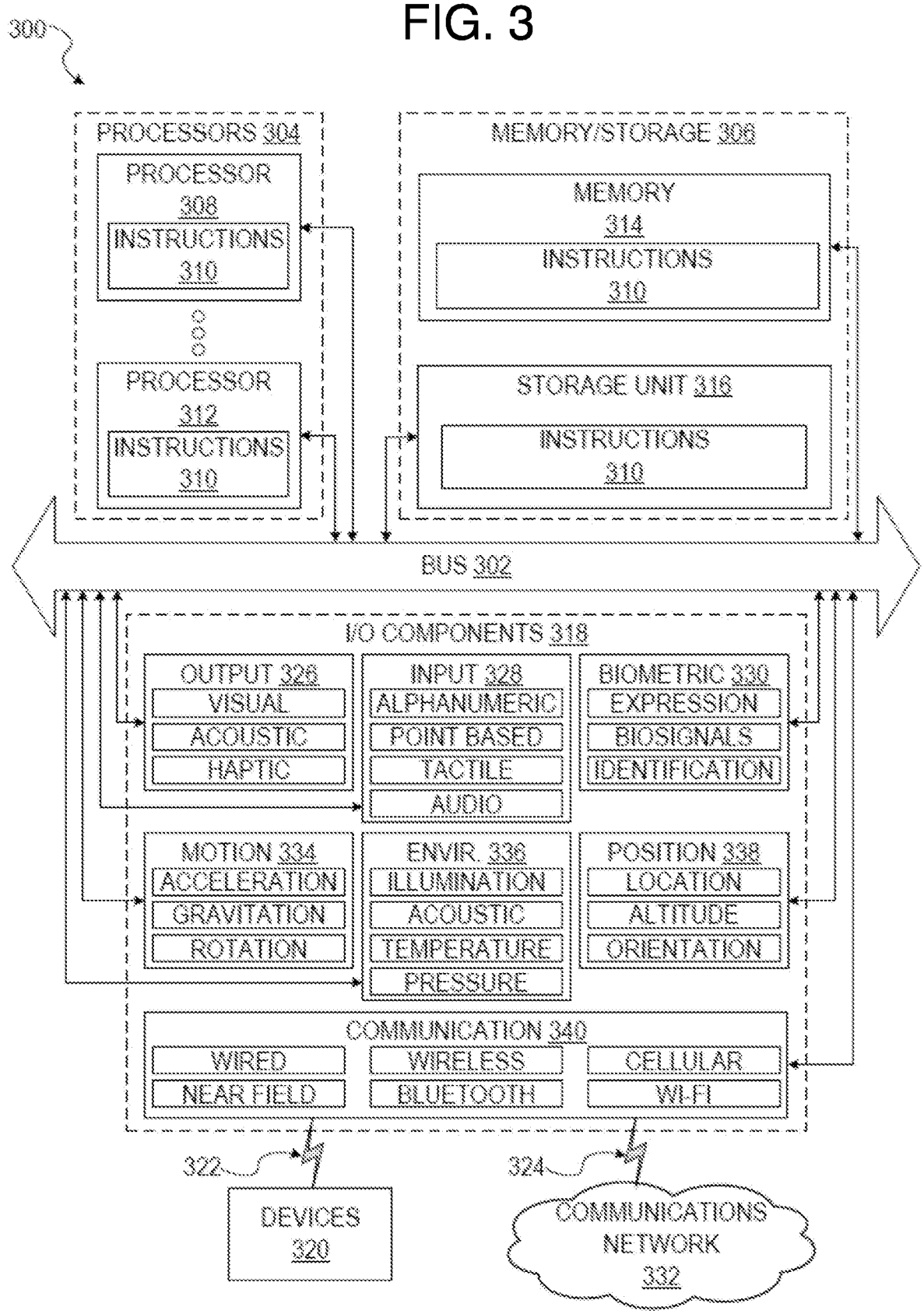
FIG. 3 is a block diagram illustrating components of an example machine able to read instructions from a machine storage medium and perform any one or more of the methodologies discussed herein, in accordance with an example embodiment.

Various embodiments described herein may be implemented by way of the example software architecture illustrated by and described with respect to FIG. 2 or by way of the example machine illustrated by and described with respect to FIG. 3.

Figure 1B:
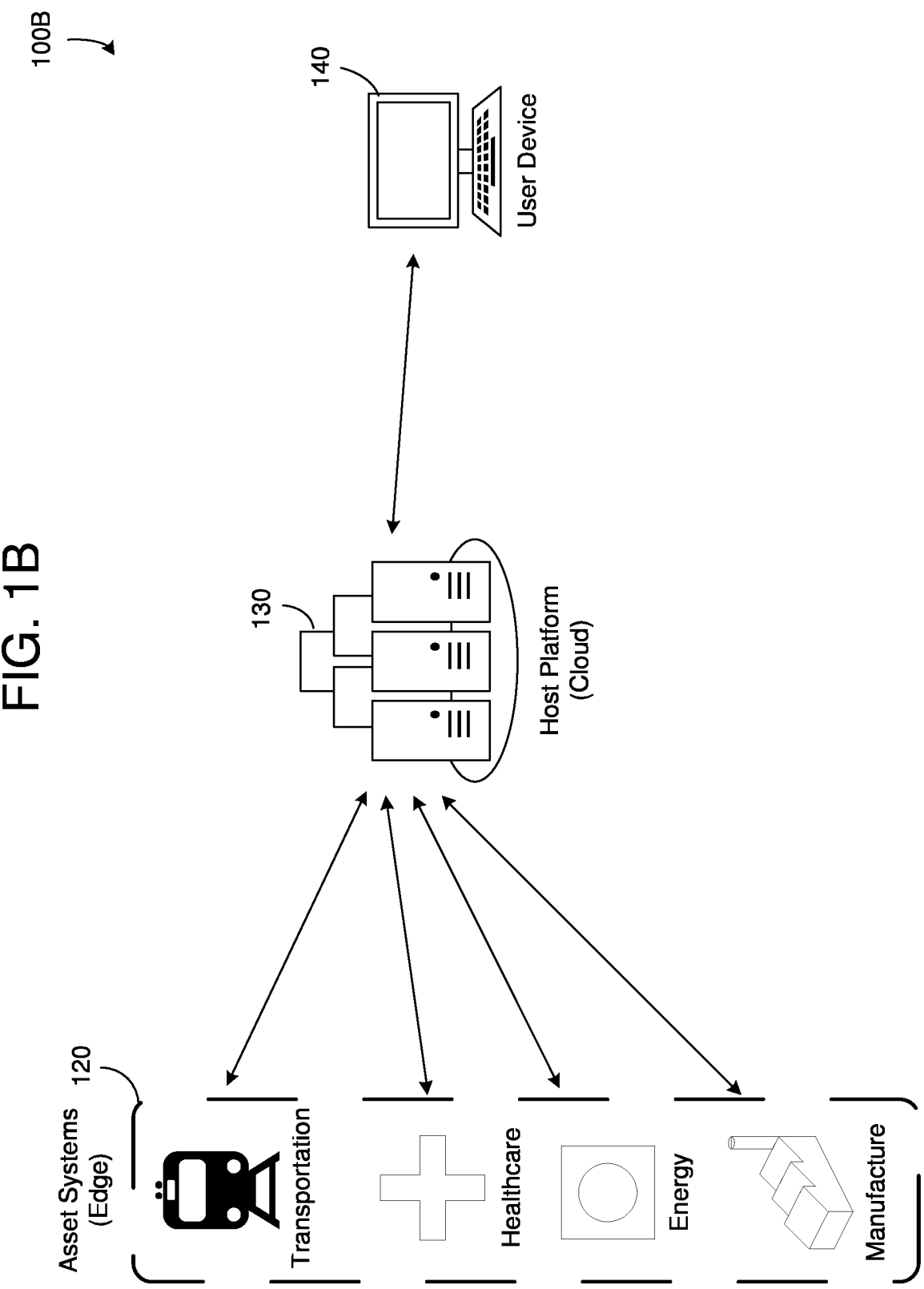
FIG. 1B is a diagram illustrating a cloud computing environment in accordance with an example embodiment.

FIG. 1B illustrates a cloud computing system 150 for industrial software and hardware in accordance with an example embodiment. Referring to FIG. 1, the system 150 includes a plurality of assets 120 which may be included within an edge of an IIoT and which may transmit raw data to a source such as cloud computing platform 130 where it may be stored and processed. It should also be appreciated that the cloud platform 130 in FIG. 1 may be replaced with or supplemented by a non-cloud based platform such as a server, an on-premises computing system, and the like. Assets 120 may include hardware/structural assets such as machine and equipment used in industry, healthcare, manufacturing, energy, transportation, and that like. It should also be appreciated that assets 120 may include software, processes, actors, resources, and the like.

The data transmitted by the assets 120 and received by the cloud platform 120 may include raw time-series data output as a result of the operation of the assets 110, and the like. Data that is stored and processed by the cloud platform 130 may be output in some meaningful way to user devices 140. In the example of FIG. 1, the assets 110, cloud platform 130, and user devices 140 may be connected to each other via a network such as the Internet, a private network, a wired network, a wireless network, etc. Also, the user devices 140 may interact with software hosted by and deployed on the cloud platform 130 in order to receive data from and control operation of the assets 120.

Software and hardware systems can be used to enhance or otherwise used in conjunction with the operation of an asset and a digital twin of the asset (and/or other assets) may be hosted by the cloud platform 130 and may interact with the asset. For example, analytic applications implementing one or more ML models may be used to optimize a performance of an asset or data coming in from the asset. As another example, the ML models may be used to analyze, control, manage, repair, or otherwise interact with the asset and components (software and hardware) thereof. A user device 140 may receive views of data or other information about the asset as the data is processed via one or more analytic applications hosted by the cloud platform 130. For example, the user device 140 may receive graph-based results, diagrams, charts, warnings, measurements, power levels, and the like. As another example, the user device 140 may display a graphical user interface that allows a user thereof to input commands to an asset via one or more applications hosted by the cloud platform 130.

In some embodiments, an asset management platform (AMP) can reside within or be connected to the cloud platform 130, in a local or sandboxed environment, or can be distributed across multiple locations or devices and can be used to interact with the assets 120. The AMP can be configured to perform functions such as data acquisition, data analysis, data exchange, and the like, with local or remote assets, or with other task-specific processing devices. For example, the assets 120 may be an asset community (e.g., turbines, healthcare, power, industrial, manufacturing, mining, oil and gas, elevator, etc.) which may be communicatively coupled to the cloud platform 130 via one or more intermediate devices such as a stream data transfer platform, database, or the like.

Information from the assets 120 may be communicated to the cloud platform 130. For example, external sensors can be used to sense information about a function of an asset, or to sense information about an environment condition at or around an asset, a worker, a downtime, a machine or equipment maintenance, and the like. The external sensor can be configured for data communication with the cloud platform 130 which can be configured to store the raw sensor information and transfer the raw sensor information to the user devices 130 where it can be accessed by users, applications, systems, and the like, for further processing. Furthermore, an operation of the assets 120 may be enhanced or otherwise controlled by a user inputting commands though an application hosted by the cloud platform 130 or other remote host platform such as a web server. The data provided from the assets 120 may include time-series data or other types of data associated with the operations being performed by the assets 120

In some embodiments, the cloud platform 130 may include a local, system, enterprise, or global computing infrastructure that can be optimized for industrial data workloads, secure data communication, and compliance with regulatory requirements. The cloud platform 130 may include a database management system (DBMS) for creating, monitoring, and controlling access to data in a database coupled to or included within the cloud platform 130. The cloud platform 130 can also include services that developers can use to build or test industrial or manufacturing-based applications and services to implement IIoT applications that interact with assets 120.

For example, the cloud platform 130 may host an industrial application marketplace where developers can publish their distinctly developed applications and ML models and/or retrieve applications and ML models from third parties. In addition, the cloud platform 130 can host a development framework for communicating with various available services or modules. The development framework can offer developers a consistent contextual user experience in web or mobile applications. Developers can add and make accessible their applications (services, data, analytics, etc.) via the cloud platform 130. Also, analytic software may analyze data from or about a manufacturing process and provide insight, predictions, and early warning fault detection.

In the example of FIG. 1, the host platform 130 may be a cloud system, an edge system, an industrial PC, an asset controller, an intervening edge server, or the like, and may receive a request to launch an analytic software application that implements an ML model. In this example, the request may be received from the user device 140, however embodiments are not limited thereto. As another example, the request may be triggered by another system or software of the host platform requesting the deployment of the ML model. In response, the host platform 130 loads the ML model from cold storage (hard disk) to an in-memory storage for processing and execution.

FIG. 2 illustrates an example of a software architecture that may be installed on a machine, according to some example embodiments. FIG. 2 is merely a non-limiting example of a software architecture, and it will be appreciated that many other architectures may be implemented to facilitate the functionality described herein. The software architecture 202 may be executing on hardware such as a machine 300 of FIG. 3 that includes, among other things, processors 304, memory 314, and I/O components 318. A representative hardware layer 204 is illustrated and can represent, for example, the machine 300 of FIG. 3. The representative hardware layer 204 comprises one or more processing units 206 having associated executable instructions 208. The executable instructions 208 represent the executable instructions of the software architecture 202, including implementation of the methods, modules, and so forth of FIG. 1. The hardware layer 204 also includes memory or storage modules 210, which also have the executable instructions 208. The hardware layer 204 may also comprise other hardware 212, which represents any other hardware of the hardware layer 204, such as the other hardware illustrated as part of the machine 300.

In the example architecture of FIG. 2, the software architecture 202 may be conceptualized as a stack of layers, where each layer provides particular functionality. For example, the software architecture 202 may include layers such as an operating system 214, libraries 216, frameworks/middleware 218, applications 220, and a presentation layer 244. Operationally, the applications 220 or other components within the layers may invoke API calls 224 through the software stack and receive a response, returned values, and so forth (illustrated as messages 226) in response to the API calls 224. The layers illustrated are representative in nature, and not all software architectures have all layers. For example, some mobile or special purpose operating systems may not provide a frameworks/middleware 218 layer, while others may provide such a layer. Other software architectures may include additional or different layers.

The operating system 214 may manage hardware resources and provide common services. The operating system 214 may include, for example, a kernel 228, services 230, and drivers 232. The kernel 228 may act as an abstraction layer between the hardware and the other software layers. For example, the kernel 228 may be responsible for memory management, processor management (e.g., scheduling), component management, networking, security settings, and so on. The services 230 may provide other common services for the other software layers. The drivers 232 may be responsible for controlling or interfacing with the underlying hardware. For instance, the drivers 232 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 216 may provide a common infrastructure that may be utilized by the applications 220 and/or other components and/or layers. The libraries 216 typically provide functionality that allows other software modules to perform tasks in an easier fashion than by interfacing directly with the underlying operating system 214 functionality (e.g., kernel 228, services 230, or drivers 232). The libraries 216 may include system libraries 234 (e.g., C standard library) that may provide functions such as memory allocation functions, string manipulation functions, mathematic functions, and the like. In addition, the libraries 216 may include API libraries 236 such as media libraries (e.g., libraries to support presentation and manipulation of various media formats such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 216 may also include a wide variety of other libraries 238 to provide many other APIs to the applications 220 and other software components/modules.

The frameworks 218 (also sometimes referred to as middleware) may provide a higher-level common infrastructure that may be utilized by the applications 220 or other software components/modules. For example, the frameworks 218 may provide various graphic user interface (GUI) functions, high-level resource management, high-level location services, and so forth. The frameworks 218 may provide a broad spectrum of other APIs that may be utilized by the applications 220 and/or other software components/modules, some of which may be specific to a particular operating system or platform.

The applications 220 include built-in applications 240 and/or third-party applications 242. Examples of representative built-in applications 240 may include, but are not limited to, a home application, a contacts application, a browser application, a book reader application, a location application, a media application, a messaging application, or a game application.

The third-party applications 242 may include any of the built-in applications 240, as well as a broad assortment of other applications. In a specific example, the third-party applications 242 (e.g., an application developed using the Android™ or iOS™ software development kit (SDK) by an entity other than the vendor of the particular platform) may be mobile software running on a mobile operating system such as iOS™, Android™ Windows® Phone, or other mobile operating systems. In this example, the third-party applications 242 may invoke the API calls 224 provided by the mobile operating system such as the operating system 214 to facilitate functionality described herein.

The applications 220 may utilize built-in operating system functions (e.g., kernel 228, services 230, or drivers 232), libraries (e.g., system 234, APIs 236, and other libraries 238), or frameworks/middleware 218 to create user interfaces to interact with users of the system. Alternatively, or additionally, in some systems, interactions with a user may occur through a presentation layer, such as the presentation layer 244. In these systems, the application/module "logic" can be separated from the aspects of the application/module that interact with the user.

Some software architectures utilize virtual machines. In the example of FIG. 2, this is illustrated by a virtual machine 248. A virtual machine 248 creates a software environment where applications/modules can execute as if they were executing on a hardware machine e.g., the machine 300 of FIG. 3, for example). A virtual machine 248 is hosted by a host operating system (e.g., operating system 214) and typically, although not always, has a virtual machine monitor 246, which manages the operation of the virtual machine 248 as well as the interface with the host operating system (e.g., operating system 214). A software architecture executes within the virtual machine 248, such as an operating system 250, libraries 252, frameworks/middleware 254, applications 256, or a presentation layer 258. These layers of software architecture executing within the virtual machine 248 can be the same as corresponding layers previously described or may be different.

Some or all of a software architecture 202 may be hosted in a cloud environment, which can deliver the software architecture 202 over a communications network as a service. A cloud environment may provide a computing environment, for example, where users can have access to applications or computing resources, as services, from anywhere through their connected devices. These services may be provided by entities called cloud services providers. Examples of services that may be provided via a cloud environment include, without limitation, infrastructure as a service (IaaS), platform as a service (PaaS), software as a service (SaaS), storage as a service (STaaS), security as a service (SECaaS), test environment as a service (TEaaS), and application program interface (API) as a service (APIaaS), among others.

FIG. 3 illustrates components of an example machine 300, according to some embodiments, able to read instructions 310 from a machine storage medium and perform any one or more of the methodologies discussed herein. Specifically, FIG. 3 shows a diagrammatic representation of the machine 300 in the example form of a computer system, within which the instructions 310 (e.g., software, a program, an application, an applet, an app, or other executable code) for causing the machine 300 to perform any one or more of the methodologies discussed herein may be executed. As such, the instructions 310 may be used to implement modules or components described herein. The instructions 310 transform the general, non-programmed machine 300 into a particular machine 300 programmed to carry out the described and illustrated functions in the manner described. In alternative embodiments, the machine 300 operates as a standalone device or may be coupled (e.g., networked) to other machines. In a networked deployment, the machine 300 may operate in the capacity of a server machine or a client machine in a server-client network environment, or as a peer machine in a peer-to-peer (or distributed) network environment.

The machine 300 may comprise, but not be limited to, Internet-of-Things (IoT) device, which can include an Industrial IoT (IIoT) device. As used herein, an IoT device can comprise a device embedded with hardware, software, or both that enables the device to collect and exchange data over a communications network (e.g., the Internet), where the data may relate to information about the device (e.g., its operation or diagnostics) or its environment, or the data exchange may facilitate remote control of the device. IIoT devices can include those devices used in business or professional settings, such as medical devices (e.g., magnetic-resonance imaging (MRI) machine), aircraft engines, and wind turbines. Additionally, the machine 300 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine 300 capable of executing the instructions 310, sequentially or otherwise, that specify actions to be taken by that machine 300. Further, while only a single machine 300 is illustrated, the term "machine" shall also be taken to include a collection of machines 300 that individually or jointly execute the instructions 310 to perform any one or more of the methodologies discussed herein.

The machine 300 may include processors 304, memory/storage 306, and I/O components 318, which may be configured to communicate with each other such as via a bus 302. The processors 304 may comprise a single processor or, as shown, comprise multiple processors (e.g., processors 308 to 312). The memory/storage 306 may include a memory 314, such as a main memory, or other memory storage, and a storage unit 316, both accessible to the processors 304 such as via the bus 302. The storage unit 316 and memory 314 store the instructions 310 embodying any one or more of the methodologies or functions described herein. The instructions 310 may also reside, completely or partially, within the memory 314, within the storage unit 316, within at least one of the processors 304 (e.g., within the processor 308's cache memory), or any suitable combination thereof, during execution thereof by the machine 300. Accordingly, the memory 314, the storage unit 316, and the memory of the processors 304 are examples of machine storage media.

The I/O components 318 may include a wide variety of components to receive input, provide output, produce output, transmit information, exchange information, capture measurements, and so on. The specific I/O components 318 that are included in a particular machine 300 will depend on the type of machine. For example, portable machines such as mobile phones will likely include a touch input device or other such input mechanisms, while a headless server machine will likely not include such a touch input device. It will be appreciated that the I/O components 318 may include many other components that are not shown in FIG. 3. The I/O components 318 are grouped according to functionality merely for simplifying the following discussion and the grouping is in no way limiting. In various embodiments, the I/O components 318 may include output components 326 and input components 328. The output components 326 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 328 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further embodiments, the I/O components 318 may include biometric components 330, motion components 334, environment components 336, or position components 338 among a wide array of other components. For example, the biometric components 330 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 334 may include acceleration sensor components (e.g., accelerometer), gravitation sensor components, rotation sensor components (e.g., gyroscope), and so forth. The environment components 336 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas sensors to detect concentrations of hazardous gases for safety or to measure pollutants in the atmosphere), or other components that may provide indications, measurements, or signals corresponding to a surrounding physical environment. The position components 338 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 318 may include communication components 340 operable to couple the machine 300 to a communications network 332 or devices 320 via a coupling 324 and a coupling 322 respectively. For example, the communication components 340 may include a network interface component or other suitable device to interface with the communications network 332. In further examples, the communication components 340 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 320 may be another machine or any of a wide variety of peripheral devices (e.g., a peripheral device coupled via a USB).

Moreover, the communication components 340 may detect identifiers or include components operable to detect identifiers. For example, the communication components 340 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 340, such as location via Internet Protocol (IP) geolocation, location via Wi-Fi® signal triangulation, location via detecting an NFC beacon signal that may indicate a particular location, and so forth.

It will be understood that "various components" (e.g., modules) used in this context (e.g., system components) refers to a device, a physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function or related functions. Components may constitute either software components (e.g., code embodied on a machine storage medium) or hardware components.

A hardware component is a tangible unit capable of performing certain operations and may be configured or arranged in a certain physical manner. In various embodiments, one or more computer systems (e.g., a standalone computer system, a client computer system, or a server computer system) or one or more hardware components of a computer system (e.g., a processor 308 or a group of processors 304) may be configured by software (e.g., an application 216 or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations.

A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor 308 or other programmable processor 308. Once configured by such software, hardware components become specific machines (or specific components of a machine 300) uniquely tailored to perform the configured functions and are no longer general-purpose processors 304. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering embodiments in which hardware components are temporarily configured (e.g., programmed), each of the hardware components need not be configured or instantiated at any one instance in time. For example, where a hardware component comprises a general-purpose processor 308 configured by software to become a special-purpose processor, the general-purpose processor 308 may be configured as respectively different special-purpose processors (e.g., comprising different hardware components) at different times. Software accordingly configures a particular processor 308 or processors 304, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between or among such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors 304 that are temporarily configured (e.g., by software) or permanently configured to perform the relevant operations. Whether temporarily or permanently configured, such processors 304 may constitute processor-implemented components that operate to perform one or more operations or functions described herein. As used herein, "processor-implemented component" refers to a hardware component implemented using one or more processors 304. Similarly, the methods described herein may be at least partially processor-implemented, with a particular processor 308 or processors 304 being an example of hardware. For example, at least some of the operations of a method may be performed by one or more processors 304 or processor-implemented components.

Moreover, the one or more processors 304 may also operate to support performance of the relevant operations in a "cloud computing" environment or as a "software as a service" (SaaS). For example, at least some of the operations may be performed by a group of computers (as examples of machines 300 including processors 304), with these operations being accessible via a communications network 332 (e.g., the Internet) and via one or more appropriate interfaces (e.g., an API). The performance of certain of the operations may be distributed among the processors 304, not only residing within a single machine 300, but deployed across a number of machines 300. In some embodiments, the processors 304 or processor-implemented components may be located in a single geographic location (e.g., within a home environment, an office environment, or a server farm). In other embodiments, the processors 304 or processor-implemented components may be distributed across a number of geographic locations.

For some embodiments, a ML model as described herein may be loaded by a machine 300 of FIG. 3, or a virtual machine 248 of FIG. 2, which serves predictions based on the ML model. The machine 300 or virtual machine 248 may host a ML prediction platform that utilizes a set of ML models to serve predictions. The machine 300 or the virtual machine 248 may represent a cloud-based resource or an edge device. As used herein, an edge device may comprise a device on the edge, or an outermost layer, of a large distributed network of data connected devices, which may include central servers, intermediate servers, data repositories, gateways, routers, and the like. An edge device may include, without limitation, an IoT device as described herein.

Using an embodiment described herein, a ML prediction platform hosted in a cloud environment may be able to more quickly horizontally scale up (e.g., to handle an increased prediction workload) by adding more worker nodes to serve predictions than previously possible. In particular, the embodiment may permit an added worker node just to more quickly load an ML model and be ready to provide prediction services in less time than before. For example, assuming a worker node performs twenty prediction per a second, and a present need exists for one hundred predictions per a second, the latency to horizontally scaling up by adding worker nodes could be reduced from twenty minutes to one-third of a minute by using an embodiment described herein.

In another instance, a ML prediction platform may be operating on an edge device, which may be an Industrial IoT (IIoT) device or an IoT gateway device. Sending data from the IIoT device to a remote computing resource, such as a cloud-based prediction platform, may not be practical due to the amount of data the IIoT device collets and reports for prediction purposes (e.g., analytics or diagnostics). For example, some IIoT devices are capable of collecting and reporting up to a terabyte (or more) of data an hour. In view of this, performing predictions at or near the edge, such as on the IIoT device or at the IoT gateway device, may be beneficial. Accordingly, an ML model may be pushed to the edge device hosting the ML prediction platform and loaded by the ML prediction platform. An embodiment described herein may permit pushed ML model to be loaded by the ML prediction platform when the edge device has limited computing resources, such as low processing or memory resources.

Figure 4:
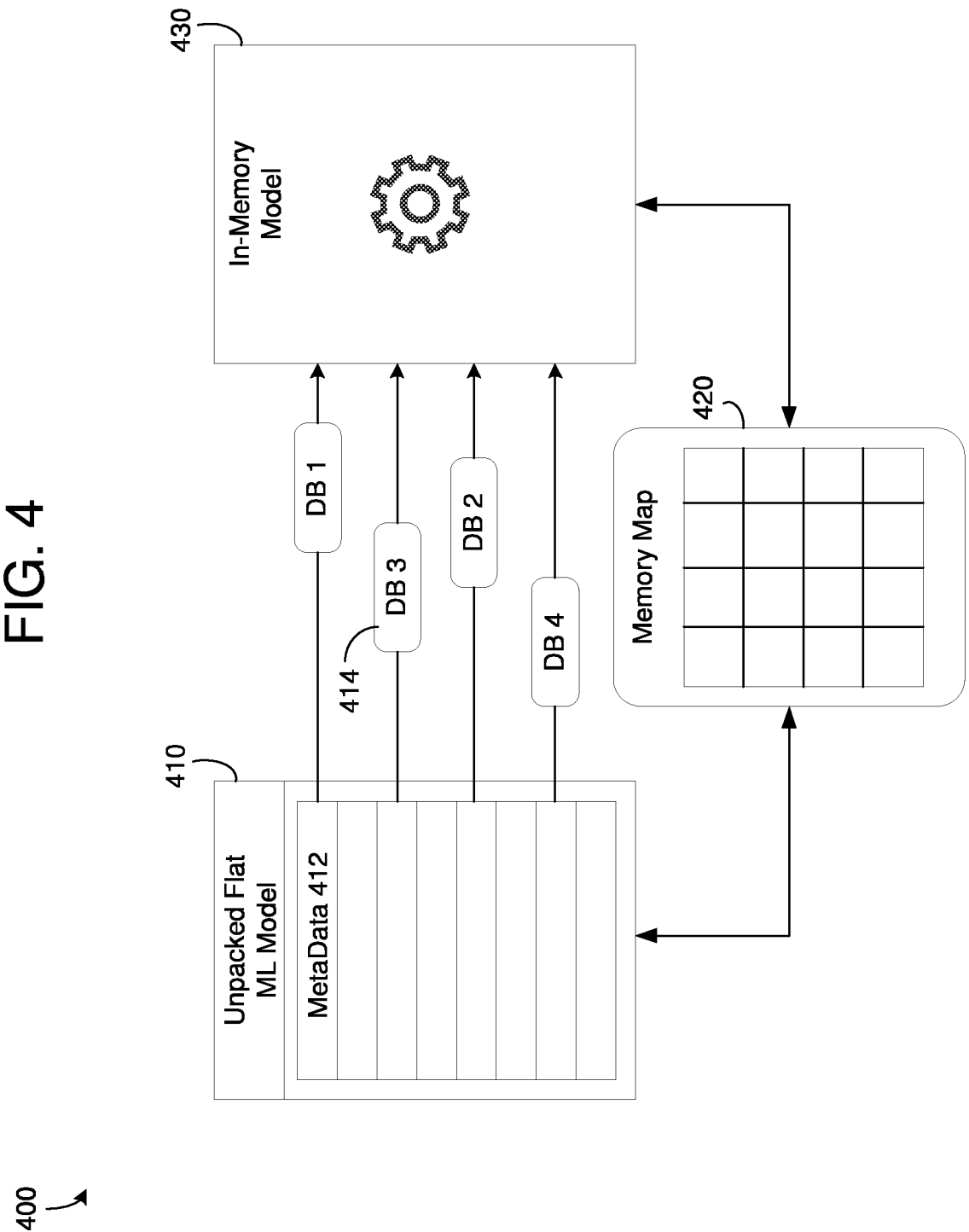
FIG. 4 is a diagram illustrating a process of loading a parse-free memory model to an in-memory location in accordance with an example embodiment.

FIG. 4 illustrates a process 400 of loading a parse-free memory model 410 (storing the ML model) to an in-memory location 430 in accordance with an example embodiment. In this example, the parse free memory model 410 does not use a process's dynamically managed heap. Instead, the PFM 410 uses a memory map 420 which memory maps the file or shared memory where the PFM model 410 is stored in its flat and unpacked representation. For example, the memory map 420 may provide an offset for transferring data blocks 414 from the structure storing the PFM 410 to the memory 430.

Rather than storing absolute pointer addresses of structure elements, the technique instead stores relative offsets to the first byte of the file 410. Like process heaps, the process 400 maintains a heap for the PFM 410. A heap-like memory management data structure is also maintained, hut rather than living in the process heap, it instead lives in the PFM 410 (mapped heap). When a block of contiguous bytes is requested from the PFM 410, an offset to the first byte of the mapped heap is returned, rather than the mapped heap itself.

The structure of the PFM 410 for the machine-learning model is a collection objects. Each object is a collection of fields. Each field has a type code, a length, and an offset that points to a list of values. A list can be used for, among other things, to define a mapping from node ids (for graphs or trees) to values.

The PFM 410 may be loaded simply by creating a memory map 420 to the file or shared memory object that represents the model 410. The model can be traversed without any unpacking. When struct field element is needed, the offset, which can be accessed in O(1) time is translated into a pointer. The PFM 410 can thus be traversed by returning temporary wrapper objects that translate offsets to temporary pointers that are computed from the starting address of the memory map 420.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, semiconductor memory such as read-only memory (ROM), a random-access memory (RAM) and/or any non-transitory transmitting/receiving medium such as the Internet, cloud storage, the Internet of Things, or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system comprising:
   a storage; and
   a processor in communication with the storage and configured to:
   receive a request to deploy a machine learning model,
   in response to receiving the request, create a memory map comprising a mapping of a data structure for storing an unpacked flat representation of the machine learning model,
   allocate a contiguous block of memory of the data structure mapped by the memory map,
   load data blocks of the unpacked flat representation of the machine learning model into the allocated contiguous block of memory of the data structure, and
   store an offset associated with the contiguous block of memory in the storage.

2. The computing system of claim 1, wherein the unpacked flat representation of the machine learning model comprises a parse-free memory model which can be traversed without parsing and unpacking.

3. The computing system of claim 1, wherein the data structure storing the unpacked flat representation of the machine learning model comprises a data file having an organizational structure mapped by the memory map.

4. The computing system of claim 1, wherein the unpacked flat representation of the machine learning model comprises a tree structure of objects, and the objects are connected via offsets.

5. The computing system of claim 4, wherein each object comprises fields including one or more of a type code, a length, and an offset that points to a list of values.

6. The computing system of claim 1, wherein the processor is configured to initially load metadata of the unpacked flat representation of the machine learning model into the data structure, and then load the data blocks of the unpacked flat representation of the machine learning model into the data structure.

7. The computing system of claim 6, wherein the metadata is loaded from a root object of the unpacked flat representation of the machine learning model.

8. The computing system of claim 1, wherein the processor is further configured to execute an application that launches the unpacked flat representation of the machine learning model.

9. A computer-implemented method comprising:
receiving a request to deploy a machine learning model;
in response to receiving the request, creating a memory map comprising a mapping of a data structure for storing an unpacked flat representation of the machine learning model;
allocating a contiguous block of memory of the data structure that is mapped by the memory map;
loading data blocks of the unpacked flat representation of the machine learning model into the allocated contiguous block of memory of the data structure; and
storing an offset associated with the contiguous block of memory in a storage.

10. The computer-implemented method of claim 9, wherein the unpacked flat representation of the machine learning model comprises a parse-free memory model which can be traversed without parsing and unpacking.

11. The computer-implemented method of claim 9, wherein the data structure storing the unpacked flat representation of the machine learning model comprises a data file having an organizational structure mapped by the memory map.

12. The computer-implemented method of claim 9, wherein the unpacked flat representation of the machine learning model comprises a tree structure of objects, and the objects are connected via offsets.

13. The computer-implemented method of claim 12, wherein each object comprises fields including one or more of a type code, a length, and an offset that points to a list of values.

14. The computer-implemented method of claim 9, wherein the loading comprises initially loading metadata of the unpacked flat representation of the machine learning model into the data structure, and then loading the data blocks of the unpacked flat representation of the machine learning model into the data structure.

15. The computer-implemented method of claim 14, wherein the metadata is loaded from a root object of the unpacked flat representation of the machine learning model.

16. The computer-implemented method of claim 9, further comprising executing an application that launches the unpacked flat representation of the machine learning model.

17. A non-transitory computer readable medium comprising program instructions which when executed cause a processor to perform a method comprising:
receiving a request to deploy a machine learning model;
in response to receiving the request, creating a memory map comprising a mapping of a data structure for storing an unpacked flat representation of the machine learning model;
allocating a contiguous block of memory of the data structure that is mapped by the memory map;
loading data blocks of the unpacked flat representation of the machine learning model into the allocated contiguous block of memory of the data structure; and
storing an offset associated with the contiguous block of memory in a storage.

18. The non-transitory computer readable medium of claim 17, wherein the unpacked flat representation of the machine learning model comprises a parse-free memory model which can be traversed without parsing and unpacking.

19. The non-transitory computer readable medium of claim 17, wherein the data structure storing the unpacked flat representation of the machine learning model comprises a data file having an organizational structure mapped by the memory map.

20. The non-transitory computer readable medium of claim 17, wherein the unpacked flat representation of the machine learning model comprises a tree structure of objects, and the objects are connected via offsets.

* * * * *